United States Patent [19]

Hall

[11] Patent Number: 5,450,688
[45] Date of Patent: Sep. 19, 1995

[54] DEVICES FOR SUPPORTING A PLURALITY OF FISHING RODS WITH REELS WHEN IN THEIR TWO-PIECE STATES

[76] Inventor: Jeffrey L. Hall, 7331 Parkside Dr., Lawrence, Ind. 46226

[21] Appl. No.: 243,261

[22] Filed: May 16, 1994

[51] Int. Cl.$^6$ .................... A01K 97/08; A01K 87/00
[52] U.S. Cl. ............................... 43/26; 43/25; 43/54.1; 224/922; 206/315.11
[58] Field of Search ............... 43/4, 25, 26, 54.1; 206/315.11; 224/922

[56] References Cited

U.S. PATENT DOCUMENTS

| | | | |
|---|---|---|---|
| 754,971 | 3/1904 | Cloherty | 43/26 |
| 3,678,611 | 7/1972 | Files | 43/54.1 |
| 3,889,860 | 6/1975 | Lindsey | 234/922 |
| 3,987,574 | 10/1976 | Pennino | 43/54.1 |
| 4,003,612 | 1/1977 | Munsell | 43/25 |
| 4,628,628 | 12/1986 | Burgin | 43/26 |
| 5,071,048 | 12/1991 | Price | 224/922 |
| 5,137,319 | 8/1992 | Sauder | 206/315.11 |

Primary Examiner—Kurt Rowan

[57] ABSTRACT

A device for supporting a plurality of fishing rods with reels when in their two-piece states comprising, in combination, a handle formed of a generally horizontally disposed linear member having a grip in the central extent thereof with downwardly turned ends with outwardly extending support rods the support member also having a carrying strap extending upwardly from the ends and over the grip and notches; a pair of support wheels, each support wheel having a central recess for the receipt of a support rod for coupling therebetween, each of the support wheels having a plurality of axially aligned recesses extending inwardly from the periphery, the recesses being formed in pairs of large and small recesses, with the recesses of the wheels in axial alignment to form complementary sets for the receipt of fishing rod halves with the smaller outboard end in each rod half in the larger recesses; and a pair of bases, each formed with a flat segment positionable on the ground and an upper segment coupled with respect to the lowermost extent of a support wheel whereby the support wheels and bases may be received on the ground in a generally horizontal orientation.

8 Claims, 7 Drawing Sheets

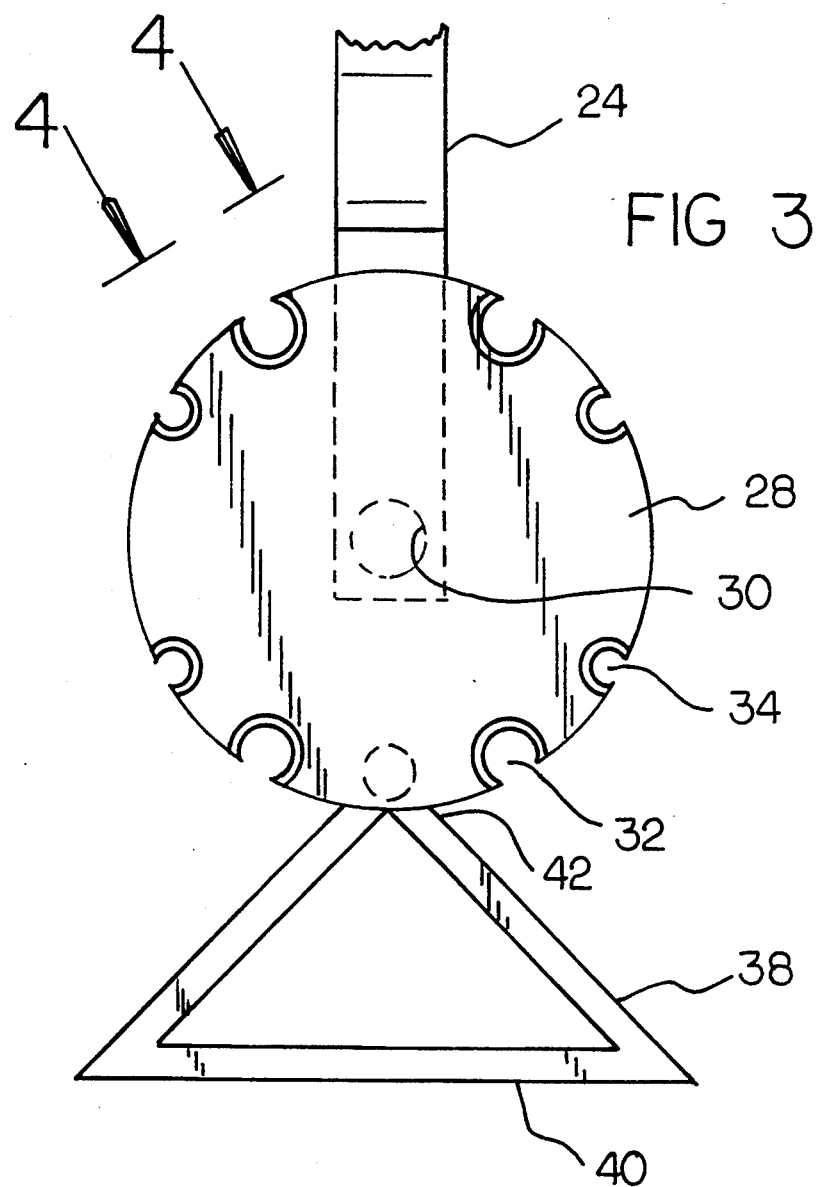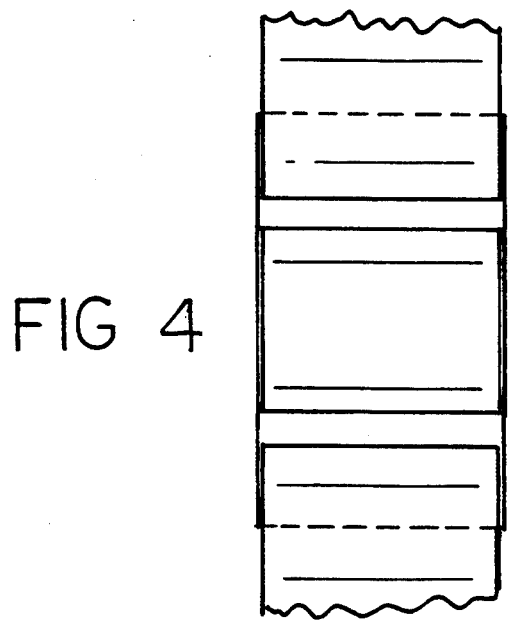

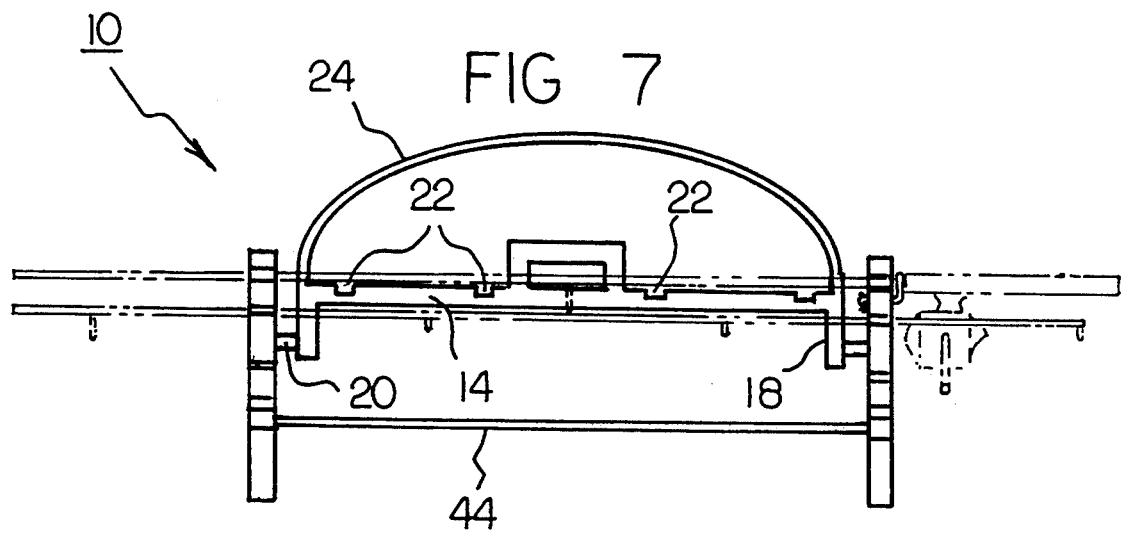
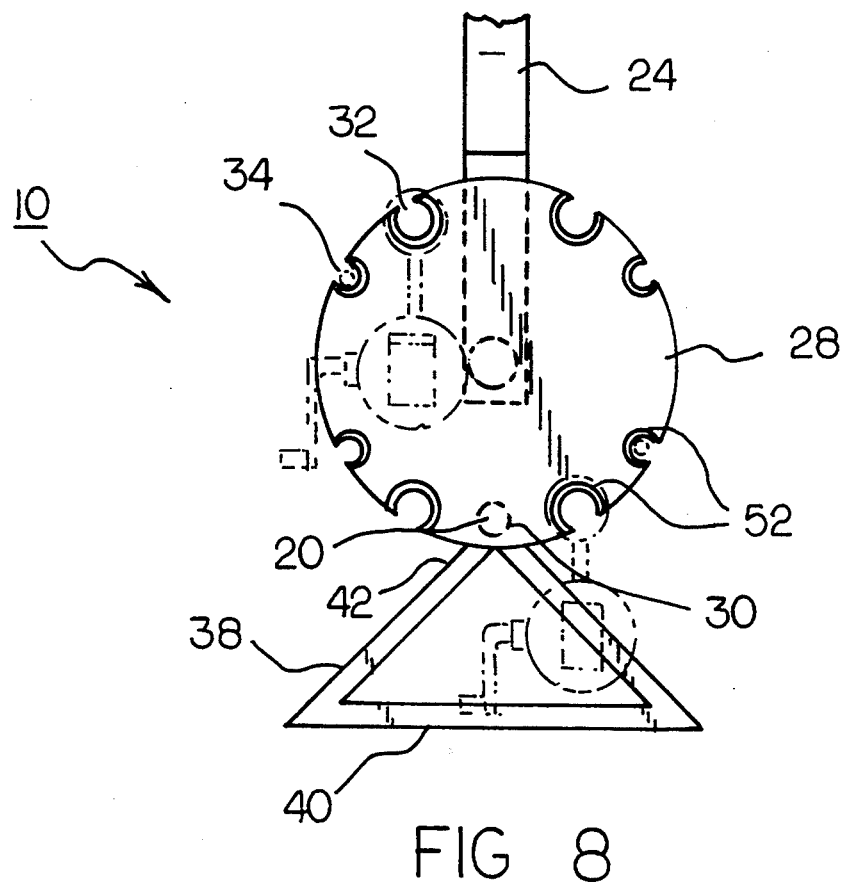

DEVICES FOR SUPPORTING A PLURALITY OF FISHING RODS WITH REELS WHEN IN THEIR TWO-PIECE STATES

BACKGROUND OF THE INVENTION

1. Field of the Invention

The present invention relates to devices for supporting a plurality of fishing rods with reels when in their two-piece states and more particularly pertains to supporting and transporting fishing rods when disassembled into two pieces.

2. Description of the Prior Art

The use of devices for carrying fishing rods is known in the prior art. More specifically, devices for carrying fishing rods heretofore devised and utilized for the purpose of supporting fishing rods and carrying them are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,508,357 to A. C. Collin, et al. a combination fishing rod carrier, holder and display hanger.

U.S. Pat. No. 3,662,933 to J. Michael discloses a carrier for fishing poles and reels ready to use.

U.S. Pat. No. 3,674,190 to G. Wright discloses a carrier for rods with reels attached.

U.S. Pat. No. 4,858,366 to R. Rushton discloses a combined fishing rod holder, carrier and storage apparatus.

U.S. Pat. No. 5,040,324 to R. Rivers, et al. discloses a carrier strap assembly for carrying a plurality of fishing rods and reels.

In this respect, the devices for supporting a plurality of fishing rods with reels when in their two-piece states according to the present invention substantially departs from the conventional concepts and designs of the prior art, and in doing so provides an apparatus primarily developed for the purpose of supporting and transporting fishing rods when disassembled into two pieces.

Therefore, it can be appreciated that there exists a continuing need for new and improved devices for supporting a plurality of fishing rods with reels when in their two-piece states which can be used for supporting and transporting fishing rods when disassembled into two pieces. In this regard, the present invention substantially fulfills this need.

SUMMARY OF THE INVENTION

In view of the foregoing disadvantages inherent in the known types of devices for carrying fishing rods now present in the prior art, the present invention provides an improved devices for supporting a plurality of fishing rods with reels when in their two-piece states. As such, the general purpose of the present invention, which will be described subsequently in greater detail, is to provide a new and improved devices for supporting a plurality of fishing rods with reels when in their two-piece states and method which has all the advantages of the prior art and none of the disadvantages.

To attain this, the present invention essentially comprises a new and improved device for supporting a plurality of fishing rods with reels when in their two-piece states comprising, in combination, a handle formed of a generally horizontally disposed linear member having a grip in the central extent thereof with downwardly turned ends with outwardly extending support rods and with notches formed in the upper surface of the handle at regularly spaced intervals between the grip and ends, the support member also having a carrying strap extending upwardly from the ends and over the grip and notches; a pair of support wheels, each support wheel having a central recess for the receipt of a support rod for coupling therebetween, each of the support wheels having a plurality of axially aligned recesses extending inwardly from the periphery, the recesses being formed in pairs of large and small recesses, with the recesses of the wheels in axial alignment to form complementary sets for the receipt of fishing rod halves with the smaller outboard end each rod half in the smaller recesses and the larger inboard end of each rod half in the larger recesses; a pair of triangular bases, each formed with a flat segment positionable on the ground and a pointed apex coupled with respect to the lowermost extent of each support wheel whereby the support wheels and bases may be received on the ground in a generally horizontal orientation; a support rod coupling the facing surfaces of the triangular bases adjacent to their uppermost extent of the bases; a plurality of elastic members, each secured at its end to the exterior faces of the support wheels radially inwardly of each of the large recesses for coupling the supported part of the fishing rod therein; and elastomeric grommets located around each of the recesses to preclude scratching of the fishing pole when supported therein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved devices for supporting a plurality of fishing rods with reels when in their two-piece states which have all the advantages of the prior art devices for carrying fishing rods and none of the disadvantages.

It is another object of the present invention to provide new and improved devices for supporting a plurality of fishing rods with reels when in their two-piece states which may be easily and efficiently manufactured and marketed.

It is further object of the present invention to provide new and improved devices for supporting a plurality of fishing rods with reels when in their two-piece states which are of durable and reliable constructions.

An even further object of the present invention is to provide new and improved devices for supporting a plurality of fishing rods with reels when in their two-piece states which are susceptible of a low cost of manufacture with regard to both materials and labor, and which accordingly are then susceptible of low prices of sale to the consuming public, thereby making such devices for supporting a plurality of fishing rods with reels when in their two-piece states economically available to the buying public.

Still yet another object of the present invention is to provide new and improved devices for supporting a plurality of fishing rods with reels when in their two-piece states which provide in the apparatuses and methods of the prior art some of the advantages thereof, while simultaneously overcoming some of the disadvantages normally associated therewith.

Still another object of the present invention is to support and transport fishing rods when disassembled into two pieces.

Lastly, it is an object of the present invention to provide new and improved device for supporting a plurality of fishing rods with reels when in their two-piece states comprising, in combination, a handle formed of a generally horizontally disposed linear member having a grip in the central extent thereof with downwardly turned ends with outwardly extending support rods the support member also having a carrying strap extending upwardly from the ends and over the grip and notches; a pair of support wheels, each support wheel having a central recess for the receipt of a support rod for coupling therebetween, each of the support wheels having a plurality of axially aligned recesses extending inwardly from the periphery, the recesses being formed in pairs of large and small recesses, with the recesses of the wheels in axial alignment to form complementary sets for the receipt of fishing rod halves with the smaller outboard end in each rod half in the larger recesses; and a pair of bases, each formed with a flat segment positionable on the ground and an upper segment coupled with respect to the lowermost extent of a support wheel whereby the support wheels and bases may be received on the ground in a generally horizontal orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an end elevational view of the device shown in FIGS. 1 and 2.

FIG. 4 is an enlarged partial end view taken along lines 4—4 of FIG. 3.

FIG. 7 is a front elevational view similar to FIG. 2 but illustrating fishing rod secured thereto.

FIG. 8 is an end elevational view of the device as illustrated in FIG. 7.

The same reference numerals refer to the same parts through the various Figures,

DESCRIPTION OF THE PREFERRED EMBODIMENT

Figure 1:
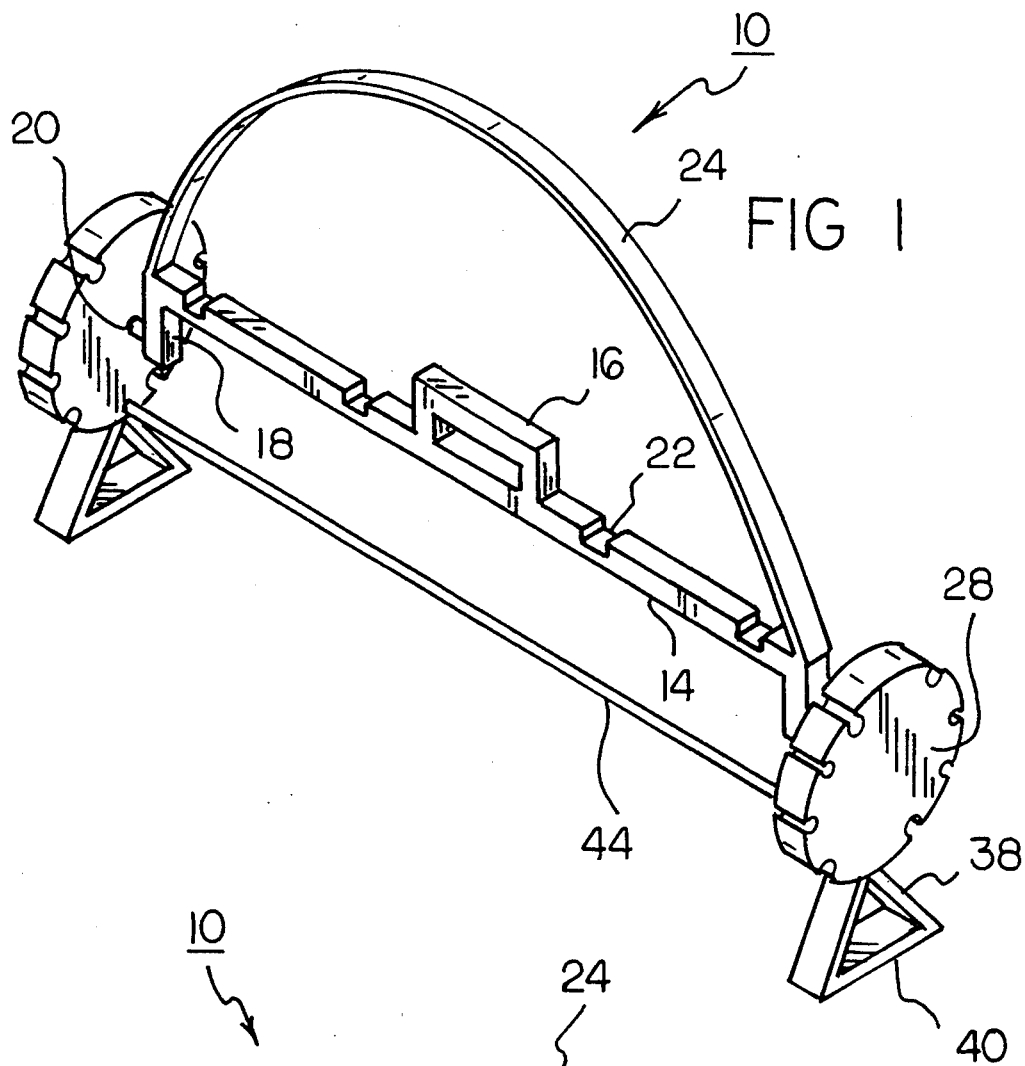
FIG. 1 is a perspective view of the preferred embodiment of the new and improved device for supporting a plurality of fishing rods with reels when in their two-piece states constructed in accordance with the principles of the present invention.
Figure 2:
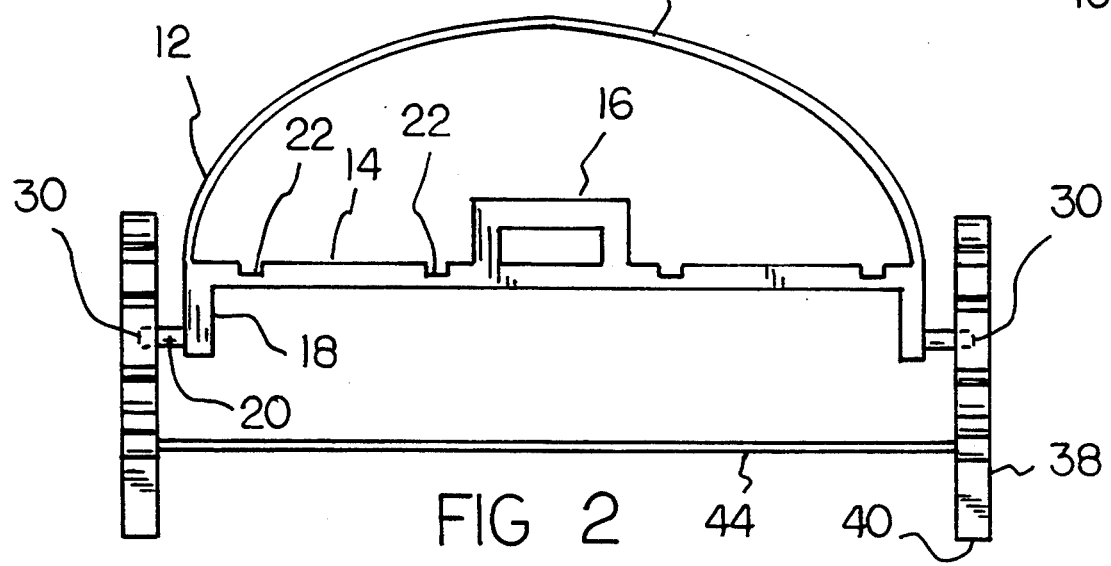
FIG. 2 is a front elevational view illustrating the device of FIG. 1.

With reference now to the drawings, and in particular to FIG. 1 thereof, the preferred embodiment of the new and improved devices for supporting a plurality of fishing rods with reels when in their two-piece states embodying the principles and concepts of the present invention and generally designated by the reference numeral 10 will be described.

Specifically, it will be noted in the various Figures that the present invention, the new and improved device for supporting a plurality of fishing rods with reels when in their two-piece states, is comprised of a plurality of individual components. In their broadest context, such components include a handle, support wheels, triangular bases, a support rod, a plurality of elastic members and elastomeric grommets. Each of the components is specifically configured and correlated one with respect to the other to attain the desired objectives.

More specifically, the device 12 is formed of a generally horizontally disposed linear member 14 having a grip 16 at the central extent thereof. Downwardly turned ends 18 are located at each end of the linear member. Outwardly extending from the ends are support rods 20. In addition, notches 22 are formed in the upper surface of the handle for supporting a fishing rod or anything else that may be desired. The notches are at regularly spaced intervals between the grip and the ends of the linear member. For greater convenience in supporting the present inventive device, a carrying strap 24 extends upwardly from the ends of the linear member and over the grip and notches. This also is preferable for carrying over the shoulder of the user.

Next providing is a pair of support wheels 28. The support wheels are generally configured of a similar construction. Each support wheel has a central recess 30 for the receipt of an associated support rod for mutual coupling therebetween. Each of the support wheels also has a plurality of axially aligned recesses 32 and 34. The recesses extend inwardly from the periphery of each wheel. The recesses are formed in pairs with large recesses 32 and small recesses 34. The recesses of the opposing wheels are in axial alignment. In this manner, they form complimentary sets of recesses for the receipt of a fishing rod which is separated as is normal in the construction of fishing rods. Consequently, each set of recesses supports a fishing rod half. The support is through the smaller outboard end of each rod half in the smaller recesses and the larger inboard end of each rod half in the larger recesses.

Located at the lowermost extent of each device is a pair of triangular bases 38. Each base is formed with a flat segment 40 adapted to be positioned on the ground for holding the device in a proper orientation. Each triangular base also includes a pointed apex 42. Each triangular base is coupled to an associated support wheel adjacent to the apex. The coupling is at the lowermost extent of the associated support wheel. In this manner, the support wheels and triangular bases may be received on the ground in a generally horizontal orientation for maximum convenience of storage and retrieval of fishing rod halves.

Additional support is provided to the device through a support rod 44. The one support rod couples the facing surfaces of the triangular bases. Contact is adjacent to the uppermost extent of the bases and the lowermost support of the support wheels.

Figure 5:
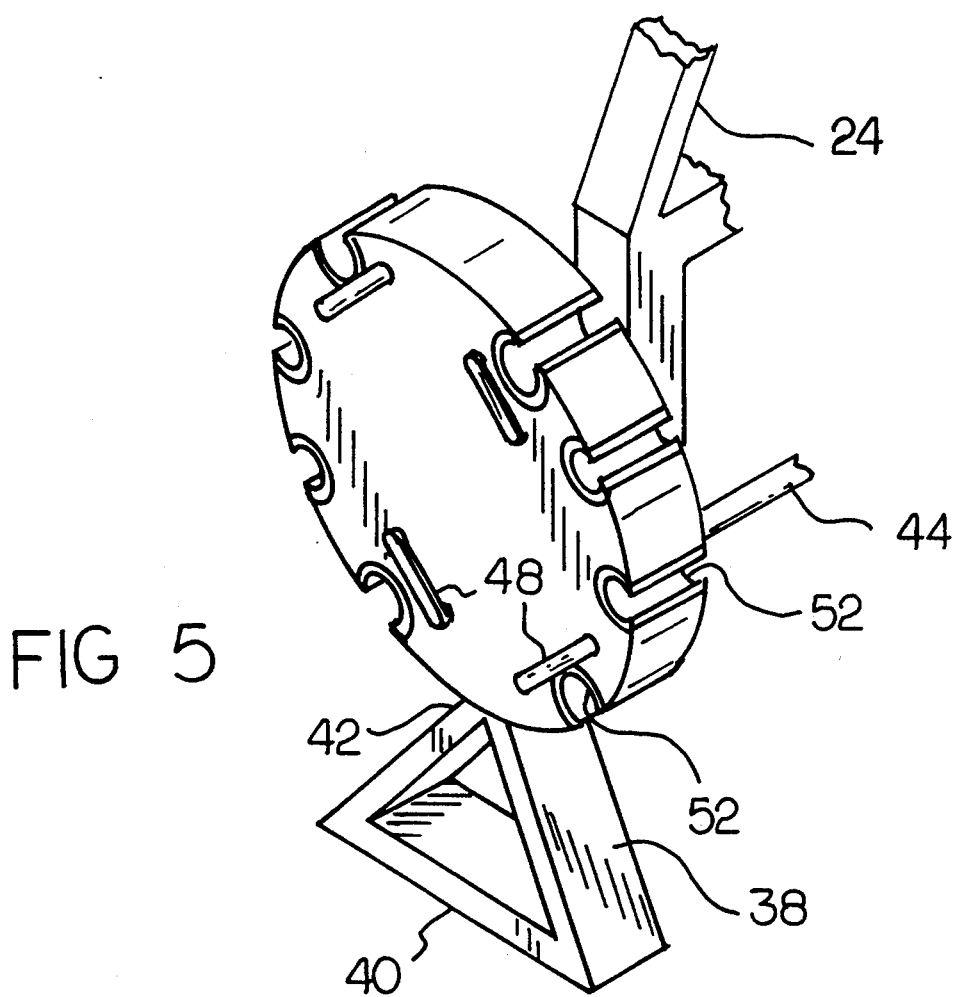
FIG. 5 is a perspective view of one of the device of the prior Figures.
Figure 6:
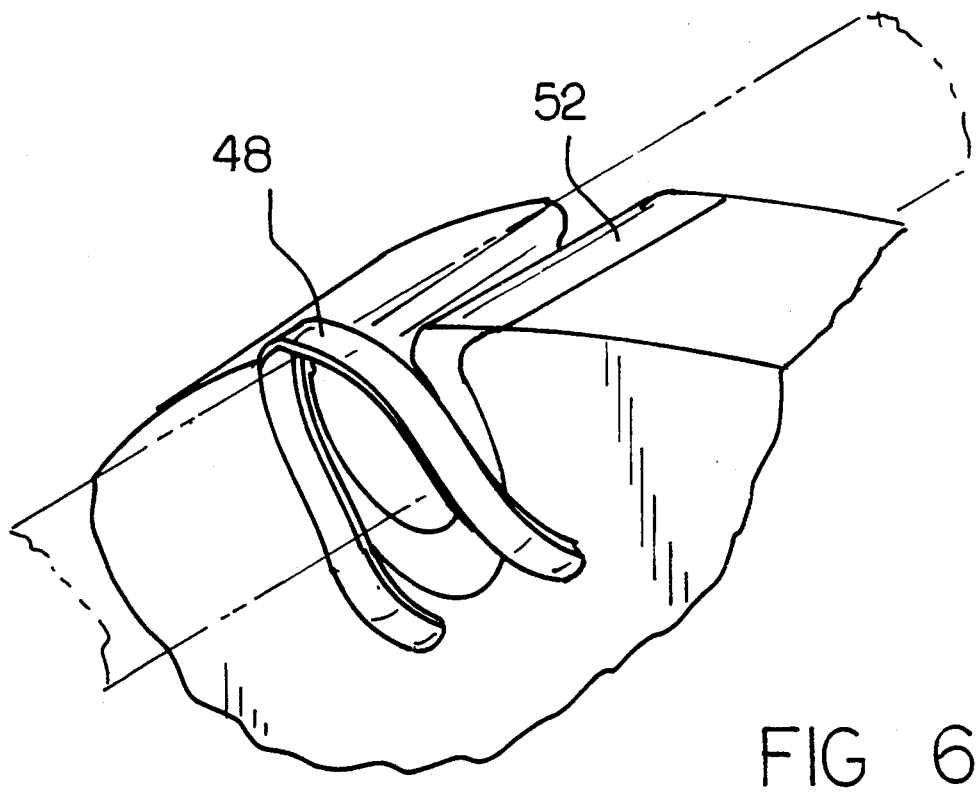
FIG. 6 is an enlarged perspective view of the device of FIG. 5 but with one of the elastic members extended.

As can be most clearly seen in FIGS. 5 and 6, a plurality of elastic members 48 are provided. Each elastic member is secured at its end to an exterior face of a support wheel. Each elastic member is located radially inwardly of each of the large recesses for coupling the supported part of a fishing rod half located therein. This holds the rod in position with greater security when transporting the device with fishing rods support thereby.

The last components of the system are elastic grommets 52. The elastic grommets are generally cylindrical but in a C-shaped configuration. They are each located within an associated recess. In this manner, a fishing rod half supported in a recess will have less chance of damage since scratching is precluded due to the nature of the material of the grommet.

Figure 9:
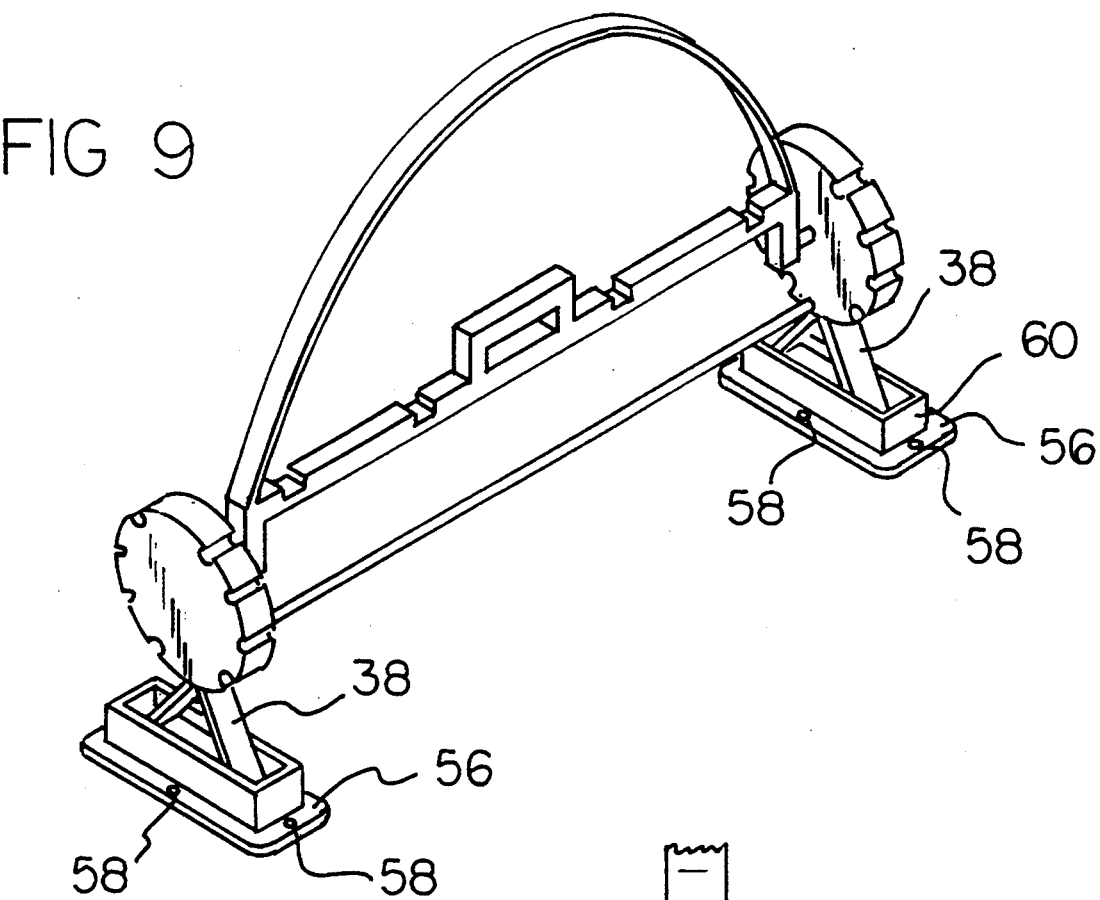
FIG. 9 is a perspective illustration of an alternate embodiment of the invention.
Figure 10:
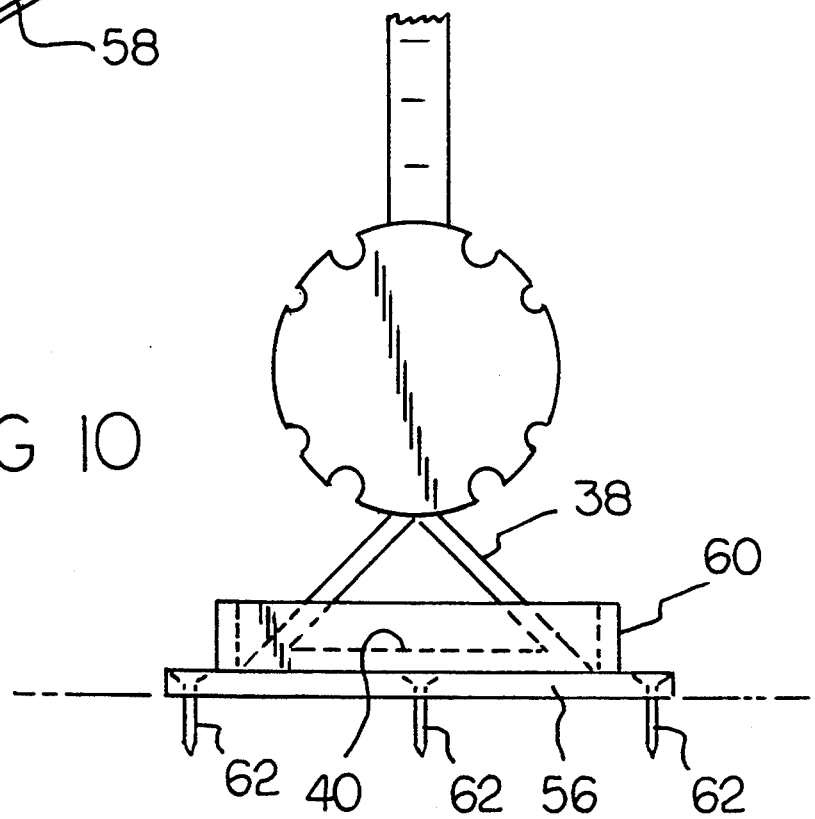
FIG. 10 is a side elevational view of the device shown in FIG. 9.

In the alternate embodiment illustrated in FIG. 9, each of the triangular bases 38, with its flat segment 40, is provided with a supplemental blower plate 56. Such blower plate is formed as a rectangle. The rectangle has along each edge adjacent to its periphery an aperture 58. Interiorly of each such aperture is an upstanding wall 60 to encompass the base. Each of the apertures is thus located around the periphery of the base for the receipt of a connecting element 62 preferably a nail or a screw, to allow coupling of the base and hence the entire device to a recipient surface whereat the device is to be utilized.

Figure 11:
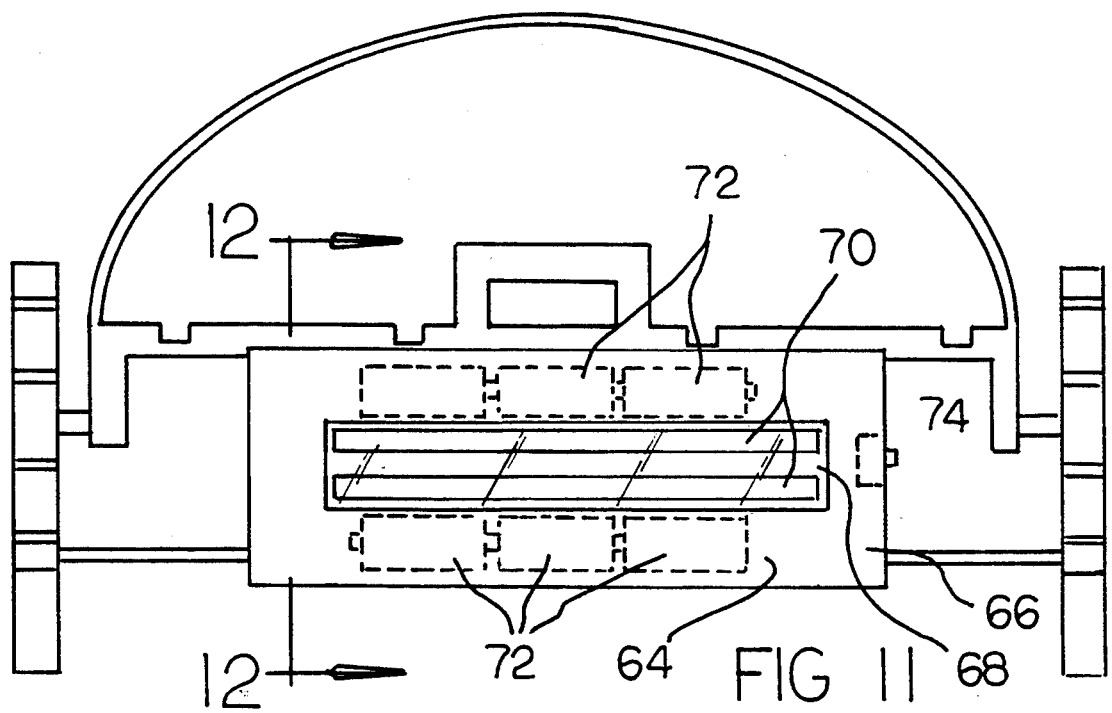
FIG. 11 is a front elevational view of a further alternate embodiment of the invention.
Figure 12:
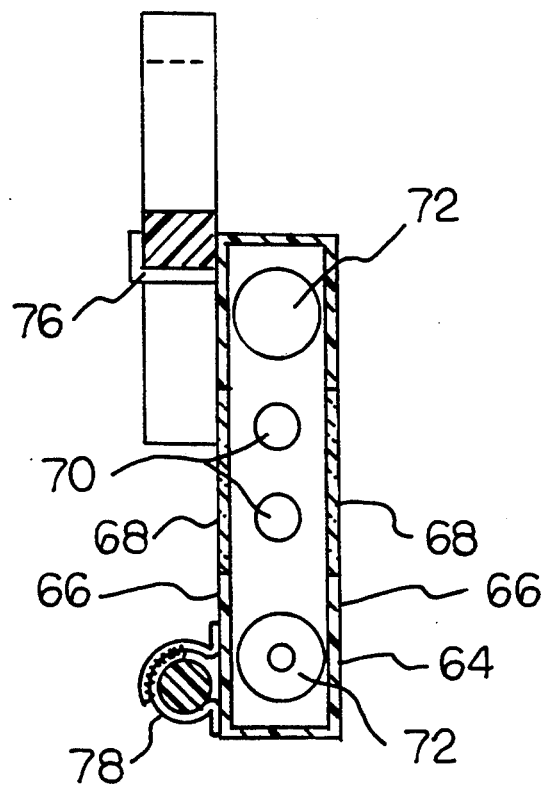
FIG. 12 is a cross sectional view taken along line 12—12 of FIG. 11.

The alternate embodiment illustrated in FIGS. 11 and 12 is designed to effect illumination of the device when used in the dark, either following sunset or prior to sunrise. According to the alternate embodiment, a housing 64, preferably of a plastic material. The housing is of a generally box-like configuration with rectangular front and rear faces 66. Secured within such front and rear faces are transparent sections 68. The transparent sections could, however, be fabricated of a translucent material. Located within the housing adjacent to the transparent sections 68 are a pair of tube lamps 70. Also within the housing in operative relationship with the lamps are a plurality of batteries 72 to function as a source of potential for illuminating the lamps. An on-/off switch 74 is operatively coupled to the batteries and lamps so that the user may selectively turn the lamps on or off as may be desired. The entire housing 64 is self contained and is provided with a hook 76 and strap 78 with pile-type fasteners whereby the housing may be selectively coupled to or removed from the device in accordance with the desires of the user.

Figure 13:
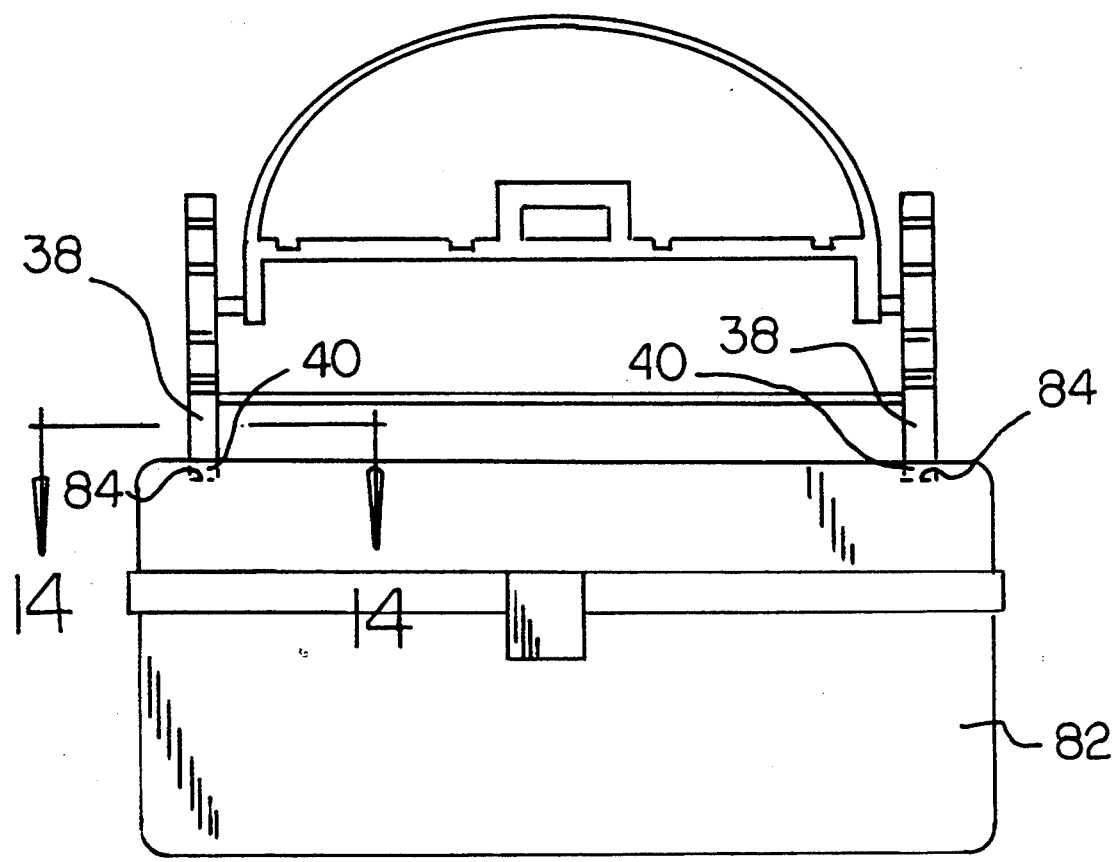
FIG. 13 is a front elevational view of a further alternate embodiment of the invention.
Figure 14:
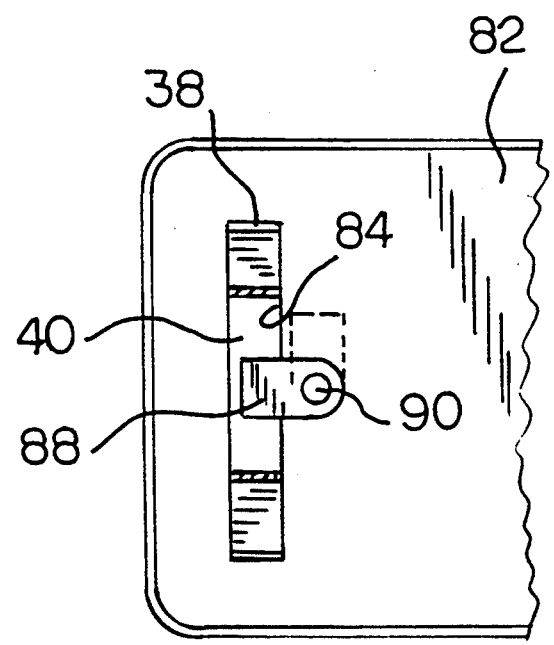
FIG. 14 is a cross sectional view taken along line 14—14 of FIG. 13.

The final embodiment is shown in FIGS. 13 and 14. In accordance with such embodiment, there is provided an associated tackle box 82. Such tackle box is provided on its upper surface with a pair of parallel recesses 84. Such recesses are formed of a length in spacing so as to receive therein the flat segment 40 of each triangular base 38. Also secured with respect to the upper surface of the tackle box are a pair of swivel plates 88. Each swivel plate is secured on a pin 90 to rotational movement between a position overlying the flat segment 40 as shown in the solid line configuration of FIG. 14 to a removed position shown as a dotted line configuration of FIG. 14. When in the dotted line configuration, the associated base may be positioned within the recess or removed therefrom. When the swivel plate is in the solid line position of FIG. 14, the base and hence the entire device is in a locked position with respect to the tackle box.

The present invention allows one to carry, display and store four two-piece rod and reels in their two-piece state. The present invention prevents damage to fishing gear and keeps the rods from tangling. It is small enough to fit in the trunk of a car, with four poles safely disassembled. While fishing, the present invention can also be used as a pole holder.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved device for supporting a plurality of fishing rods with reels when in their two-piece states comprising, in combination:

a support member having a handle formed of a generally horizontally disposed linear member having a grip in the central extent thereof with downwardly turned ends with outwardly extending support rods and with notches formed in the upper surface of the handle at regularly spaced intervals between the grip and ends, the support member also having a carrying strap extending upwardly from the ends and over the grip and notches;

a pair of support wheels, each support wheel having a central recess for the receipt of a support rod for coupling therebetween, each of the support wheels having a plurality of axially aligned recesses extending inwardly from the periphery, the recesses being formed in pairs of large and small recesses, with the recesses of the wheels in axial alignment to form complementary sets for the receipt of fishing rod halves with the smaller outboard end each rod half in the smaller recesses and the larger inboard end of each rod half in the larger recesses;

a pair of triangular bases, each formed with a flat segment positionable on the ground and a pointed apex coupled with respect to the lowermost extent of each support wheel whereby the support wheels and bases may be received on the ground in a generally horizontal orientation;

a support rod coupling the facing surfaces of the triangular bases adjacent to their uppermost extent of the bases;

a plurality of elastic members, each secured at its end to the exterior faces of the support wheels radially inwardly of each of the large recesses for coupling the supported part of the fishing rod therein; and elastomeric grommets located around each of the recesses to preclude scratching of the fishing pole when supported therein.

2. A device for supporting a plurality of fishing rods with reels when in their two-piece states comprising, in combination:

a support member having a handle formed of a generally horizontally disposed linear member having a grip in the central extent thereof with downwardly turned ends with outwardly extending support rods, the support member also having a carrying strap extending upwardly from the ends and over the grip and notches;

a pair of support wheels, each support wheel having a central recess for the receipt of a support rod for coupling therebetween, each of the support wheels having a plurality of axially aligned recesses extending inwardly from the periphery, the recesses being formed in pairs of large and small recesses, with the recesses of the wheels in axial alignment to form complementary sets for the receipt of fishing rod halves with the smaller outboard end of each rod half in the smaller recesses; and a pair of bases, each formed with a flat segment positionable on the ground and an upper segment coupled with respect to the lowermost extent of a support wheel whereby the support wheels and bases may be received on the ground in a generally horizontal orientation.

3. The device as set forth claim 2 and further including: a support rod coupling the facing surfaces of the support wheels at their lowermost extent.

4. The device as set forth in claim 2 and further including: an elastomeric member secured at its end radially to the exterior faces of the support wheels located radially inwardly of each of the large recesses for coupling the supported part of the fishing rod therein.

5. The device as set forth in claim 2 and further including: elastomeric grommets located around each of the recesses to preclude scratching of the fishing pole when in operation and use.

6. The device as set forth in claim 2 and further including a supplemental plate secured to each base with apertures extending through for receipt of a coupling member to effect securement to a recipient surface.

7. The device as set forth in claim 2 and further including a housing with mechanisms for releasable coupling to the device, the housing having at least one transparent section with an associated bulb, battery, and switch for the illumination of the bulb and hence the housing and the device.

8. The device as set forth in claim 2 wherein the flat segment of each base is positionable within a recess on the upper surface of a tackle box with an associated swivel latch to releasably secure the base to the tackle box.

* * * * *